(12) United States Patent
Hafidh et al.

(10) Patent No.: US 9,849,377 B2
(45) Date of Patent: Dec. 26, 2017

(54) PLUG AND PLAY TANGIBLE USER INTERFACE SYSTEM

(71) Applicant: Qatar University, Doha (QA)

(72) Inventors: Basim Hafidh, Doha (QA); Hussein Al Osman, Doha (QA); Ali Karime, Doha (QA); Abdulmotaleb El Saddik, Doha (QA); Jihad M. Alja'am, Doha (QA); Ali M. Jaoua, Doha (QA); Amal Dandashi, Doha (QA); Moutaz S. Saleh, Doha (QA)

(73) Assignee: QATAR UNIVERSITY, Doha (AD)

( * ) Notice: Subject to any disclaimer, the term of this patent is extended or adjusted under 35 U.S.C. 154(b) by 146 days.

(21) Appl. No.: 14/257,295

(22) Filed: Apr. 21, 2014

(65) Prior Publication Data
US 2015/0301643 A1 Oct. 22, 2015

(51) Int. Cl.
*G06F 3/041* (2006.01)
*G06F 3/044* (2006.01)
(Continued)

(52) U.S. Cl.
CPC .......... *A63F 13/235* (2014.09); *A63F 13/214* (2014.09); *A63F 13/24* (2014.09);
(Continued)

(58) Field of Classification Search
CPC ................. G06F 3/0414; G06F 3/044; G06F 2203/04112; G06F 2203/04113;
(Continued)

(56) References Cited

U.S. PATENT DOCUMENTS 5,469,740 A 11/1995 French et al.
5,524,637 A 6/1996 Erickson
(Continued)

FOREIGN PATENT DOCUMENTS

DE 102006009451 9/2007
EP 1912714 A2 4/2008
(Continued)

OTHER PUBLICATIONS

Artis Smartmat, [online], [retrieved on Dec. 5, 2014]. Retrieved from the Internet: <URL: http://www.artisllc.com/defensesystech/smartmat/index.html>.
(Continued)

*Primary Examiner* — Hong Zhou
(74) *Attorney, Agent, or Firm* — Squire Patton Boggs (US) LLP

(57) ABSTRACT

Systems and methods are provided for a dynamic user interface for interacting with computer applications by a user physically manipulating interactive floor tiles. The interactive floor tiles may be networked, and may use a communication bus 204 within the network for communicating the connection status of tiles in the network and/or any user input received by one or more tiles in the network. The tile network module may communicate data to a computer via a data collection module. The data collection module may be internal or external to the computer, and may be used to translate data from one communication format to another, for example, from RS485 framework to RS232 framework. The interactive floor tiles may be configured into various shapes at any time by a user, and the changes to the tiles may be mapped to the computer application screen in real-time.

28 Claims, 16 Drawing Sheets

(51) Int. Cl.
*A63F 13/214* (2014.01)
*A63F 13/235* (2014.01)
*G06F 3/0354* (2013.01)
*A63F 13/25* (2014.01)
*A63F 13/24* (2014.01)
*A63F 13/34* (2014.01)

(52) U.S. Cl.
CPC .............. *A63F 13/25* (2014.09); *A63F 13/34* (2014.09); *G06F 3/03547* (2013.01); *G06F 3/041* (2013.01)

(58) Field of Classification Search
CPC ......... G06F 3/045; G06F 3/016; G01L 5/228; A63F 13/02; A63F 13/06; A63F 13/214; A63F 13/2145; A63F 13/23; A63F 13/285
USPC ..................................... 463/36; 345/173–174
See application file for complete search history.

(56) References Cited

U.S. PATENT DOCUMENTS

| | | | |
|---|---|---|---|
| 5,574,669 A | 11/1996 | Marshall | |
| 5,584,779 A * | 12/1996 | Knecht ................. | A63B 24/00 434/250 |
| 5,913,727 A | 6/1999 | Ahdoot | |
| 6,110,073 A * | 8/2000 | Saur ................... | A63B 69/0053 463/36 |
| 6,450,886 B1 * | 9/2002 | Oishi ..................... | G06F 3/023 200/61.1 |
| 6,661,239 B1 | 12/2003 | Ozick | |
| 7,060,000 B2 * | 6/2006 | Carlson .............. | A63B 69/0053 434/250 |
| 7,122,751 B1 * | 10/2006 | Anderson ............... | A63F 13/06 200/5 A |
| 7,382,267 B2 | 6/2008 | Brendley et al. | |
| 7,854,686 B2 * | 12/2010 | Mar ................... | A63B 23/0458 434/250 |
| 7,938,751 B2 * | 5/2011 | Nicolas .............. | A63B 23/0458 482/1 |
| 2008/0039199 A1 | 2/2008 | Baer et al. | |
| 2008/0191864 A1 | 8/2008 | Wolfson | |
| 2009/0273560 A1 | 11/2009 | Kalanithi et al. | |
| 2010/0033425 A1 | 2/2010 | Shasek et al. | |
| 2010/0052253 A1 * | 3/2010 | Macura ..................... | A63F 9/24 273/237 |
| 2010/0144283 A1 * | 6/2010 | Curcio .................. | G06F 1/1626 455/66.1 |
| 2010/0292006 A1 * | 11/2010 | Terrell .................... | A63F 13/10 463/36 |
| 2012/0086659 A1 * | 4/2012 | Perlin ..................... | G06F 3/005 345/173 |
| 2013/0236866 A1 * | 9/2013 | MaLossi ............ | G09B 19/0015 434/247 |
| 2015/0116205 A1 * | 4/2015 | Westerman ............. | G06F 3/016 345/156 |

FOREIGN PATENT DOCUMENTS

| | | |
|---|---|---|
| FR | 2860985 A1 | 4/2005 |
| WO | WO 2010/095379 A1 | 8/2010 |
| WO | WO 2010/109061 A1 | 9/2010 |

OTHER PUBLICATIONS

Hafidh et al. "SmartPads: a plug-N-play configurable tangible user interface" Multimedia Tools and Applications, vol. 72, Issue 2, Sep. 2014, pp. 1507-1530.

Leikas et al., "An Intuitive Game in an Intelligent Ubiquitous Environment," Ercim News, online edition, [online], 2004: 57, [retrieved on Dec. 5, 2014]. Retrieved from the Internet: <URL: http://www.ercim.eu/publication/Ercim_News/enw57/leikas.html>.

Shaun, "#52 Dance Dance Revolution," Stuff Asian People Like, blog devoted to stuff that asian people like, [online], 2008, [retrieved on Dec. 5, 2014]. Retrieved from the Internet: <URL: http://www.asian-central.com/stuffasianpeoplelike/2008/04/02/52-dance-dance-revolution/>.

Weber, "Nintendo Shows Off Wii Fit and Wii Balance Board," [online], 2007, [retrieved on Apr. 11, 2014]. Retrieved from the Internet: <http://www.slipperybrick.com/2007/07/wii-fit-wiibalance-Board/>.

* cited by examiner

PLUG AND PLAY TANGIBLE USER INTERFACE SYSTEM

FIELD OF THE INVENTION

The present invention relates to a user interface for controlling computer applications, more specifically, to a dynamic user interface for interacting with computer applications by physically manipulating interactive tiles, including tiles that can be positioned on the floor.

BACKGROUND OF THE INVENTION

A tangible user interface ("TUI") can be defined as a user interface ("UI") in which a user interacts with digital information by manipulation of a physical object. Users may interact with these TUI's by stepping on them, jumping on them, touching them, or tapping them with a device. Because users are accustomed with tangibly manipulating objects in their physical environment, TUIs allow users to extend these manipulations to virtual environments. Conventionally, TUI systems have been used for entertainment, learning and for physical fitness. Some conventional TUIs are static, with fixed shapes. Others conventional TUIs are dynamic, and can be configured into a myriad of shapes depending on a user preference. These dynamic conventional TUIs cannot be changed for a specific application after they have been configured for the specific requirement.

Needs exist for a dynamic TUI that can be configured based on a user's preference into a myriad of shapes or configurations each time a user interacts with a specific computer application.

SUMMARY OF THE INVENTION

Embodiments of the present invention may include a platform for interacting with a computer application by manipulation of dynamically configurable objects, such as interactive tiles.

Embodiments of the present invention may include systems and methods for a dynamic user interface system for interacting with computer applications through a physical environment. The system may include: a network with at least one data communication bus, a plurality of nodes connected to the at least one data communication bus capable of being configured into a plurality of shapes and receiving sensory input data from a user; wherein the plurality of nodes comprises a plurality of interactive tiles; wherein each of the plurality of interactive tiles comprises electronic circuitry being operable for: identifying a connection status for at least one tile adjacent to each of the plurality of interactive tiles; identifying a source for data received by each of the plurality of interactive tiles; and transmitting the identified data to the data collection module via a communication network.

Embodiments of the present invention may include systems and methods for interacting with a computer application through manipulation of a physical environment. The method may include: creating a network with one or more nodes capable of being configured into a plurality of shapes for receiving input from physical manipulation by a user; receiving data from the network; comparing the received data against a pre-determined threshold; transmitting the compared data over a communication bus to a data collection module; analyzing the transmitted data to identify the source of the data; generating a user event, wherein said user event is based on the identified source of the data; updating a connection status tree, wherein said connection status tree depicts the current configuration of the network, and wherein said connection status tree is stored in local memory at a computer; and transmitting the updated connection status tree and the user event to a computer application, wherein said user event updates the computer application, and wherein said connection status tree updates a map of the network in real time.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

Figure 1:
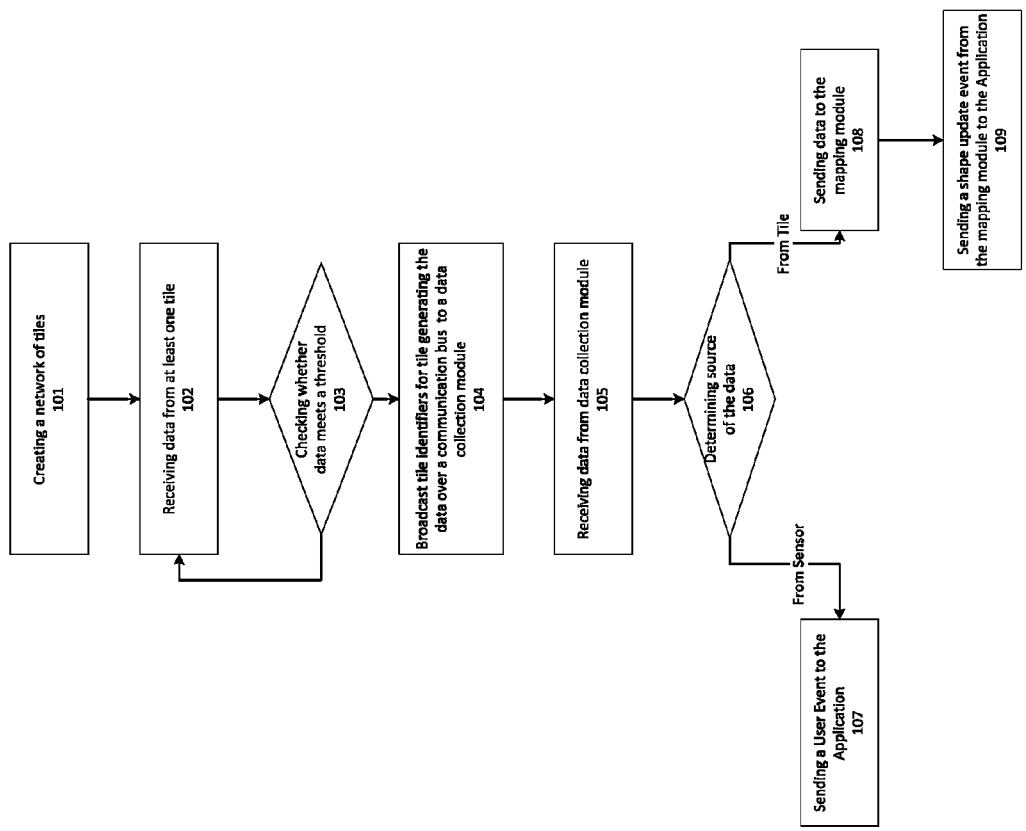
FIG. 1 is an illustration of a high level flow chart of an exemplary process for implementing the platform according to one embodiment of the invention.
Figure 2:
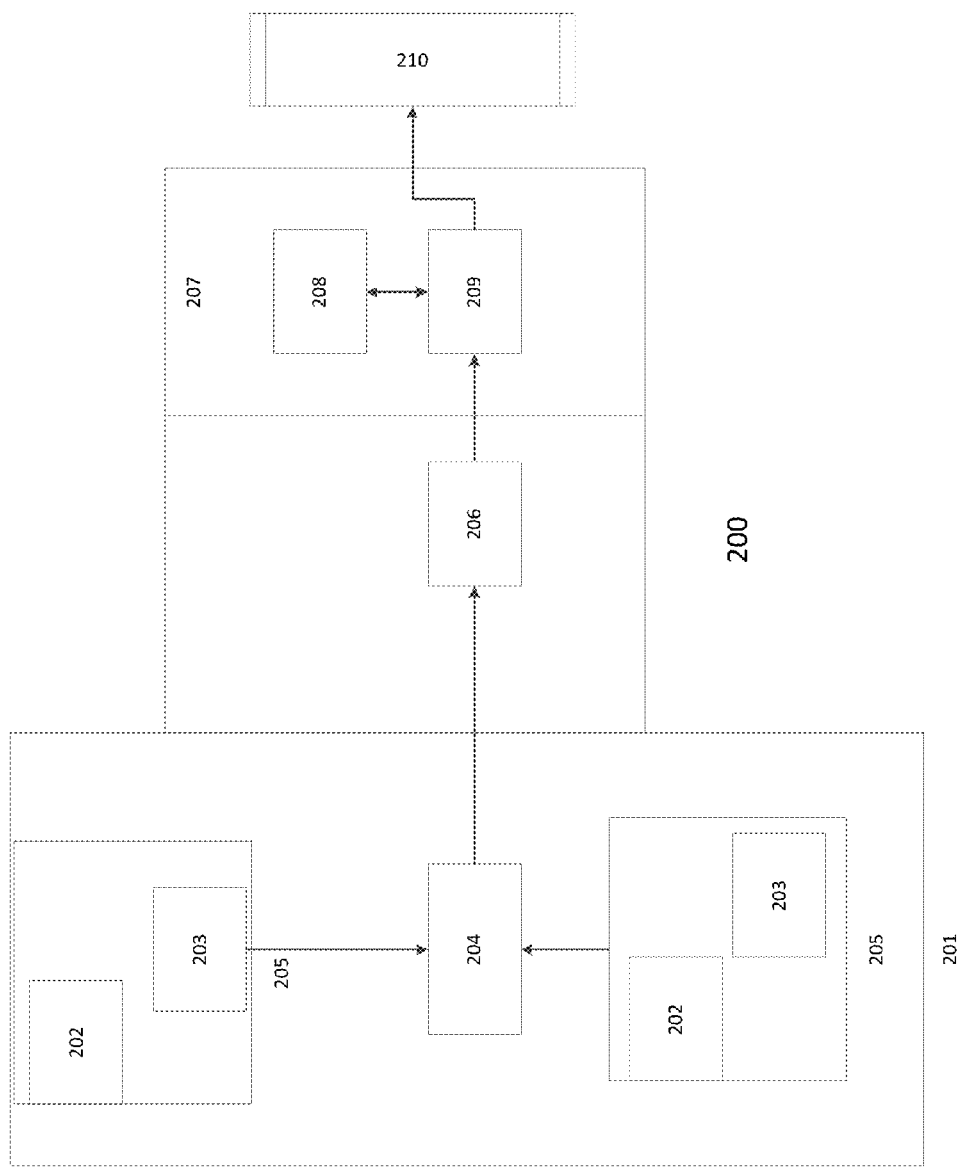
FIG. 2 is an illustration of the exemplary system architecture of the platform according to one embodiment of the invention.
Figure 3:
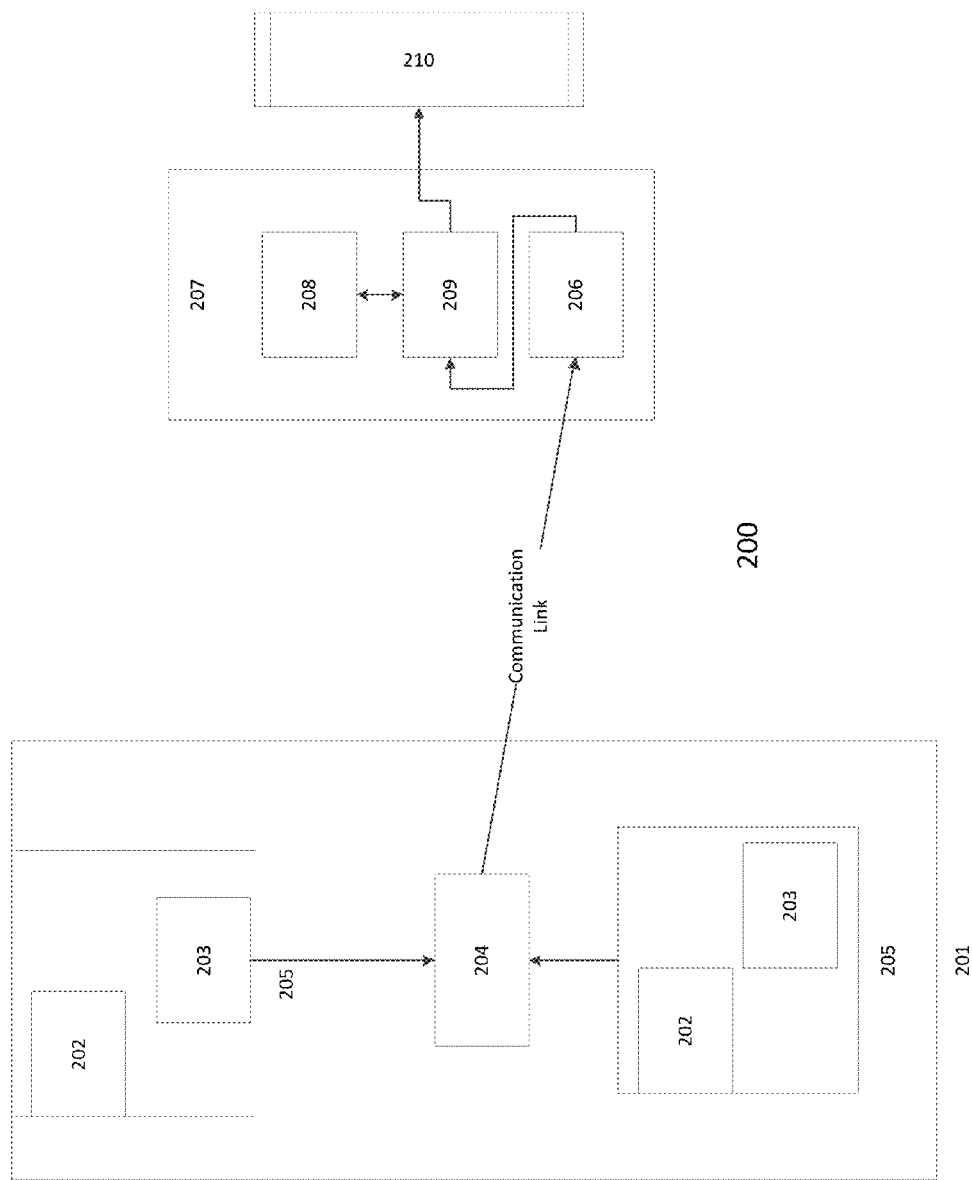
FIG. 3 is an illustration of the exemplary system architecture of the platform according to one embodiment of the invention.
Figure 4:
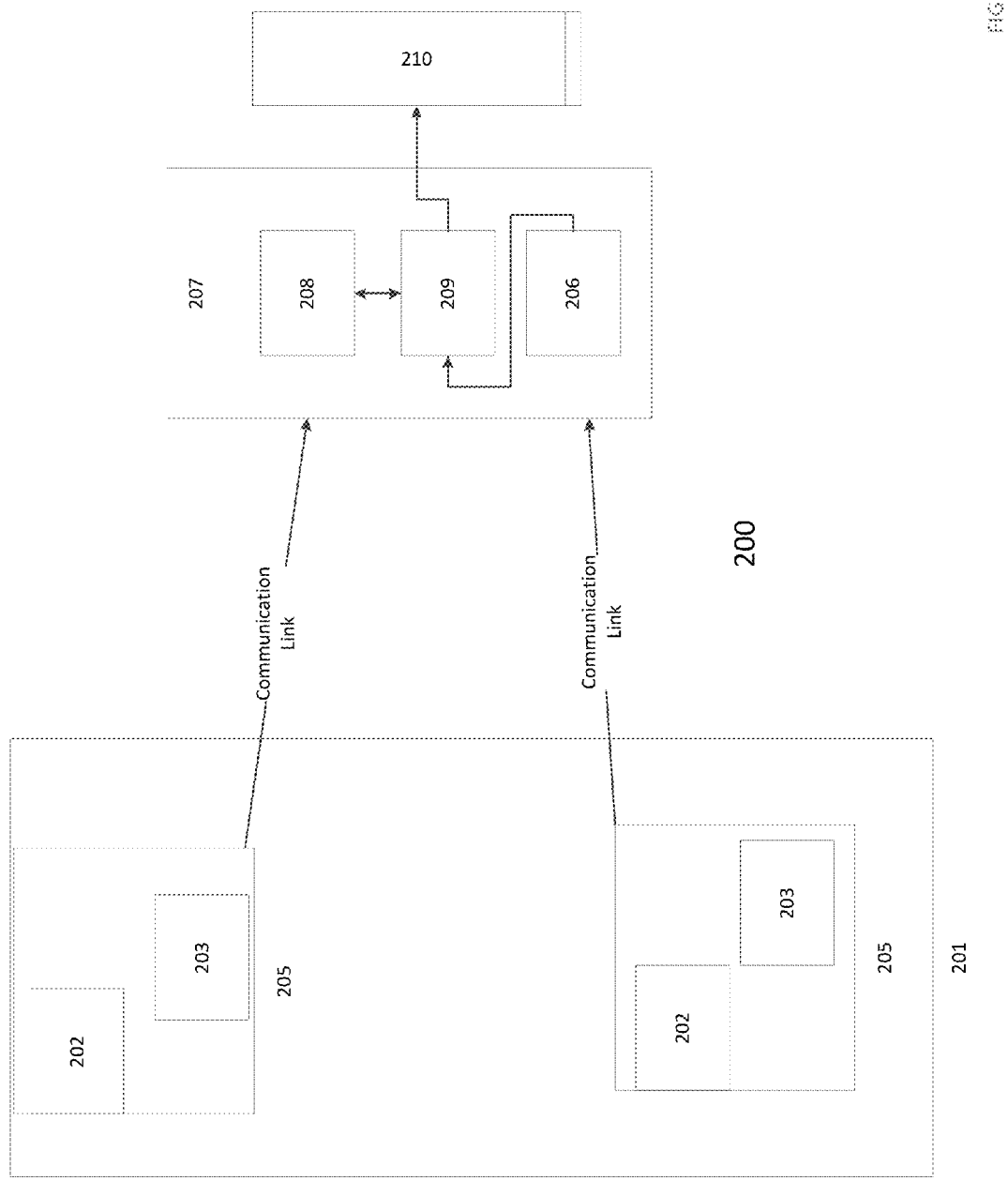
FIG. 4 is an illustration of the exemplary system architecture of the platform according to one embodiment of the invention.
Figure 5:
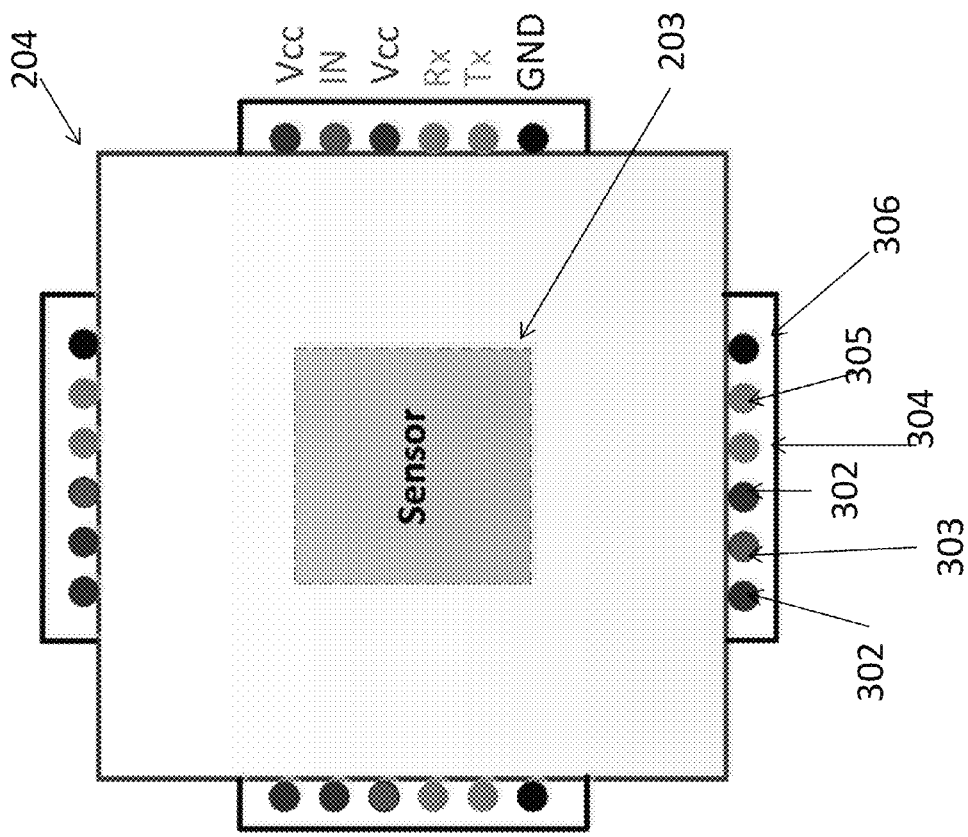
FIG. 5 is an illustration of an exemplary tile configuration according to one embodiment of the invention.

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical or structural changes may be made to the invention without departing from the spirit or scope of this disclosure. To avoid detail not necessary to enable those skilled in the art to practice the embodiments described herein, the description may omit certain information known to those skilled in the art. The following detailed description is, therefore, not to be taken in a limiting sense.

DETAILED DESCRIPTION OF THE INVENTION

As used herein, the term "real time" may include, but is not limited to, immediate, rapid, not requiring operator intervention, automatic, and/or programmed. Real time may include, but is not limited to, measurements in femtoseconds, picoseconds, nanoseconds, milliseconds, as well as longer, and optionally shorter, time intervals.

As used herein, the term "communication link" or "communication network" shall include, but not be limited by, any local area network (LAN), wide area network (WAN), intranet, extranet, mobile communication network, global communication network, wireless communication system or network, and/or the Internet, which may implement any suitable communication protocol, and/or support any framework s-based interfaces, including, but not limited to: Ethernet IP communications via Ethernet ports on the gateway, and conventional XML/TCP/IP protocols and ports are employed over secured SSL sessions; USB 2.0 via ports on the gateway; 802.11b/g/n IP communications; GSM/GPRS RF WAN communications; CDMA 1xRTT RF WAN communications (optional, can also support EVDO and 3G, 4G technologies); Dialog RF network (319.5 MHz) and RS485 Superbus 2000 wired interface; RF mesh network (908 MHz); and interfaces including RF network (345 MHz) and RS485/RS232bus wired interfaces.

Embodiments of the present invention provide an improved platform 200 for interacting with computer applications through manipulation of dynamically configurable physical objects, such as interactive tiles. In some embodiments, the physical manipulation may include a user stepping on parts of the platform 200. In some embodiments, the physical manipulation may include a user touching parts of the platform 200. In some embodiments, the physical manipulation may include a user jumping on parts of the platform 200. In some embodiments, the platform 200 may be implemented with one or more tile network modules 201, one or more DCMs 206, and one or more computers 207.

The one or more computers 207 may include computers, tablets, video game consoles, televisions and other computing devices. Each of the one or more computers 207 may be well known to those skilled in the art and may include a display, a central processor, a system memory, and a system bus that couples various system components including the system memory to the central processor unit. The system bus may be any of several types of bus structures including a memory bus or memory controller, a peripheral bus, and a local bus using any of a variety of bus architectures. The structure of system memory may be well known to those skilled in the art and may include a basic input/output system (BIOS) stored in a read only memory (ROM) and one or more program modules such as operating systems, application programs and program data stored in random access memory (RAM). The computers may also include a variety of interface units and drives for reading and writing data and a database for storing data. The one or more computers 207 may run an Operating System (OS). The OS may include a shell, for providing transparent user access to resources such as application programs. The OS may include a kernel, which provides essential services required by other parts of OS and application programs. The services provided by the kernel include memory management, process and task management, disk management, and I/O device management.

Applications running on or accessing the platform 200 may include any application required by the platform 200, such as, for example, conventional applications for entertainment, education or physical fitness, or other applications developed using object-oriented programming languages, such as, for example, C++, JAVA and C# or other conventional software programming techniques.

Figure 6:
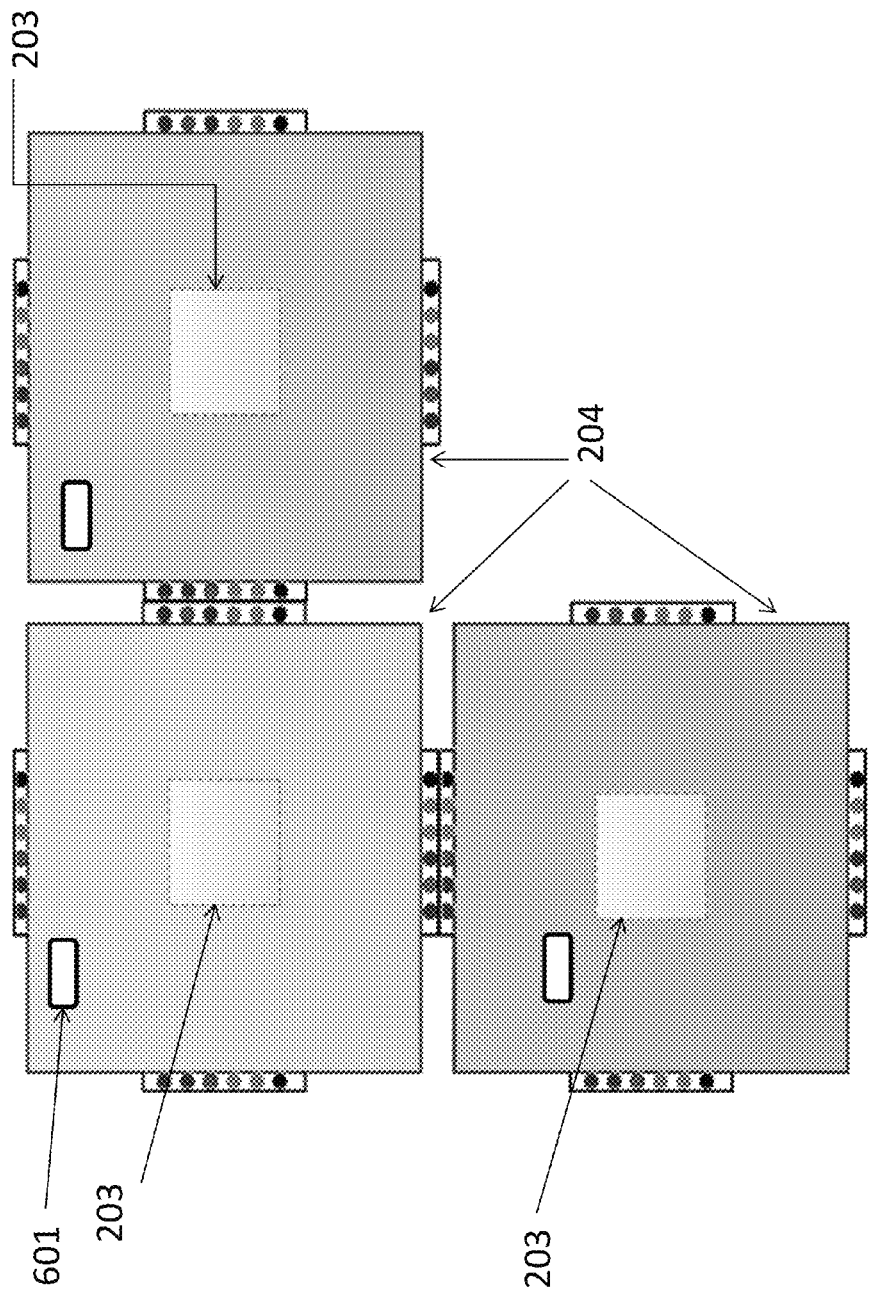
FIG. 6 is an illustration of an exemplary tile network module according to one embodiment of the invention.

In one embodiment, the platform 200 may include a tile network module 201 that can be physically manipulated by a user stepping and/or jumping on one or more tiles 205 in the tile network module 201 to interact with one or more software applications 210 running on the one or more computers 207. The tiles 205 may be configured into a variety of patterns or shape based on a user's preference or the requirements of the one or more software applications 210, each time a user accesses the one or more software applications 210. Referring to FIG. 1, there is shown a high level flow chart of an exemplary process for implementing the platform 200 according to one embodiment of the invention. In step 101, a user may create a tile network module 201 from one or more connected interactive tile 205. The tile network module 201 may have at least one communication bus 204 connected to each tile 205 in the tile network module 201. Each tile 205 in the tile network module 201 may also be equipped with one or more microcontrollers 801 (see FIG. 8) for detecting user interactivity, communication among the tiles 205, and detecting the connection status of adjacent tiles 205. Each tile 205 may have one or more sensory modules 203, tile detection modules 202, display modules 601 (see FIG. 6), and a communication bus 204 connected to the one or more microcontrollers 801. In some alternatives, the communication bus 204 may transmit data to and/or receive data from a data collection module ("DCM") 206. In some alternatives, the communication bus 204 may transmit data to and/or receive data from the computer 207. In some alternatives, the communication bus 204 used may determine the number of tiles 205, for example, an RS485 bus can support up to 128 tiles 205 and an I2C bus can support up to 112 tiles 205.

Each tile 205 may have one or more contact terminals attached to each of its sides. The one or more contact terminals may supply power to adjacent tiles 205, and detect the connection status of adjacent tiles 205. For example, the integrated circuit power supply pin contact terminal may be labeled Vcc 302 and the ground contact terminal may be labeled GND 306. The Vcc and GND contact terminals may be used for supplying adjacent tiles 205 with power, such as DC power. In another example, the serial receiving line contact terminal may be labeled Rx 304 and the serial transmitting line contact terminal may be labeled Tx 305. The Rx and Tx contact terminals may be used with a communication bus 204 for communication between the tiles 205, and between the tile network module 201 and the data collector 206. In some alternatives, the communication bus 204 may be a serial bus. In a further example, a contact terminal for the output signal from each tile 205 may be labeled OUT 307. The IN line may be used to recognize when there may be a connection or disconnection of an adjacent tile. The OUT line may be always connected to the input line of the adjacent tile to supply the connect/disconnect signal to it.

Figure 7:
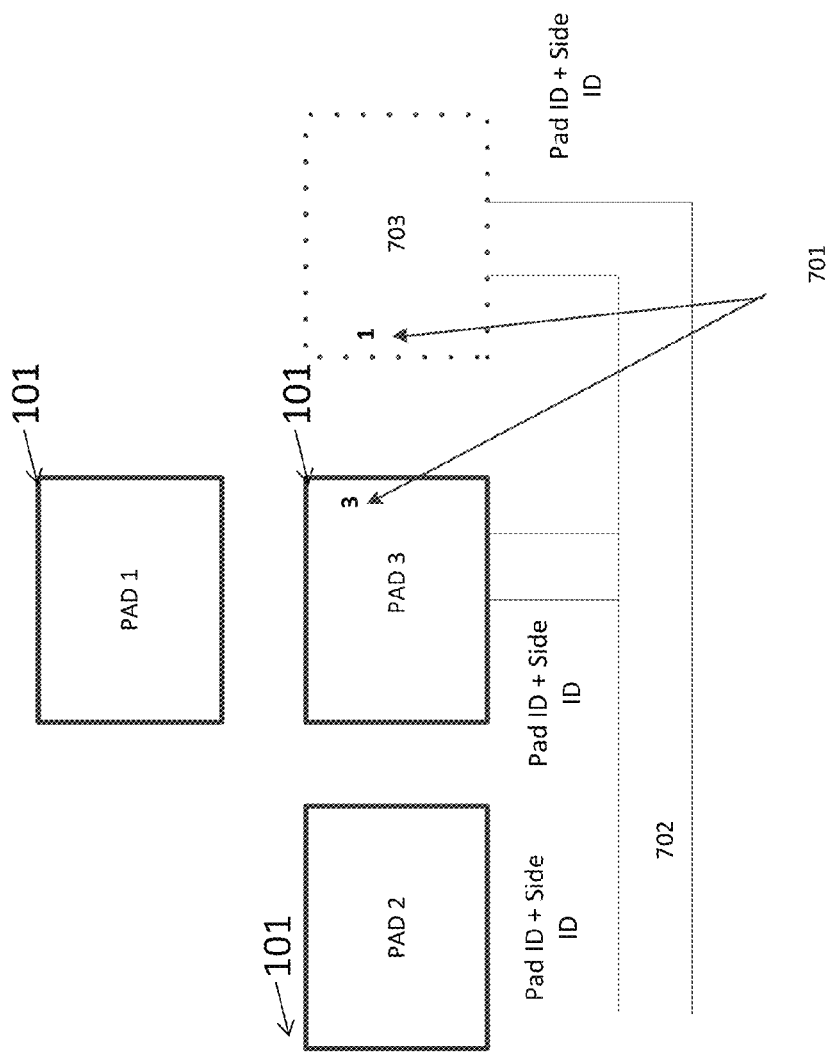
FIG. 7 is an illustration of an exemplary communication bus in a tile network module according to one embodiment of the invention.
Figure 9:
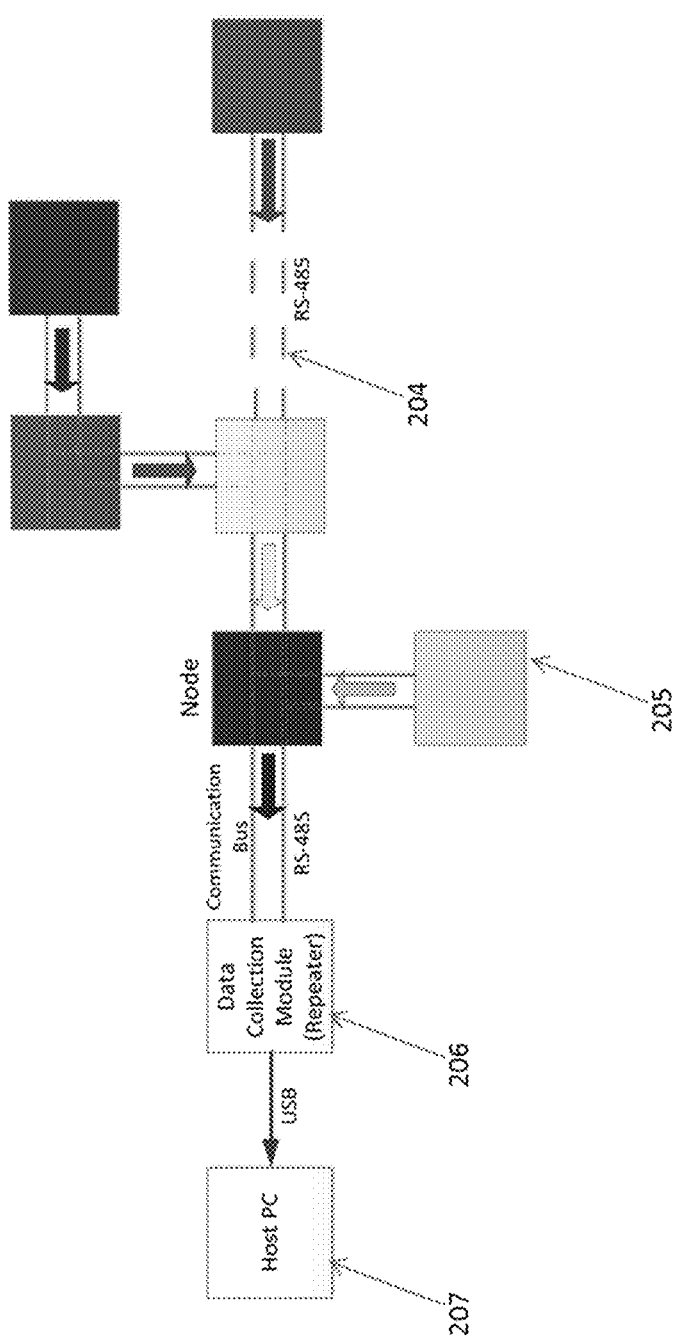
FIG. 9 is an illustration of an exemplary data flow in a tile network module according to one embodiment of the invention.

The tile detection module 202 may be responsible for detecting a new tile 701 when a new tile 701 may be physically connected to or disconnected from the tile network module 201. The platform 200 may assign a unique identification number to each tile 205 (TileID). The platform 200 may also assign a unique identification number to each side of the tile 205 (SideID). The SideID may be used to identify the side of each tile 205 that is connected to an adjacent tile 205. The TileIDs and SideIDs may be pre-assigned as static values and may be stored in the microcontroller's flash memory for each tile 205. In some alternatives, the platform 200 may assign dynamic TileIDs and/or SideIDs to the tiles 205, each time the platform 200 is activated. In some alternatives, the platform 200 may update TileIDs and SideIDs for each tile that may be stored in the microcontroller's flash memory for each tile 205. For example, as illustrated in FIG. 7, in the case of adding a new tile 701 to the platform 200, the tile detection module 202 may broadcast a connectivity message via a communication bus 204 that may include both the TileIDs and the SideIDs of all tiles 205 that may be connected to the platform 200. In the latter example, the new tile 701 may be connected to only one existing tile 205. In some alternatives, the new tile 701 may be connected to up to four existing tiles 205, on each side of the tile 205. When a tile 205 is removed from the tile network module 201, the tile network module 201 may respond by broadcasting only the TileID and SideID of the tile(s) whose state may have changed. For example, as illustrated in FIG. 9, if a tile 701 is disconnected from the tile network module 201, the tile network module 201 may broadcast the TileID and SideID of the adjacent tile 702. The connectivity information may be communicated to the host computer 207 via the data collector 206. In some alternatives, the one or more DCMs 206 may be external to the one or more computers 207. In some alternatives, the one or more DCMs 206 may be integrated within the one or more computers 207.

The sensory module 203 may include one or more actuators, such as vibration actuators, and one or more conventional sensors for receiving input from a user, such as pressure sensors. The sensory module 203 may also include one or more display modules 601, such as a light emitting diode ("LED") display for providing a visual notification to a user, when a tile 205 may be activated by the platform 200, for example by receiving power from an adjacent tile 205.

In step 102, the sensory module 203 may receive data from at least one tile 205 in the tile network module 201 via a communication bus 204. In some alternatives, the data may include information about a user physically manipulating a tile 205, for example, by stepping on a tile 250. In some alternatives, the data may include information from a tile 205 being added or removed from the tile network module 201 as discussed above. When the sensory module 203 receives data from one of the sensory modules 203, it may convert the signal from analog data to a digital data. The communication bus 204 may be responsible for providing the necessary communication among the hardware components of the platform 200. For example, the communication network among the tiles 205 may use the RS485 framework, which may be a serial method of communication. The communication bus 204 may transmit the data received from the tile detection module 202 and sensory modules 203 to the DCM 206. In some alternatives, the communication bus 204 can be carried out a USART bus, RS232 bus, RS485 bus, I2C bus, SPI bus, One-wire bus, CAN bus, other conventional bus, or any other suitable approach. In some alternatives, the DCM 206 may supply power to the one or more tiles 205. In some alternatives, the one or more computers 207 may supply power to the DCM 206. In some alternatives, the DCM 206 may be connected to a power source, such as, for example, an AC outlet or DC battery storage. In some alternatives, each tile 205 may receive power directly and/or indirectly from any conventional power source.

In step 104, the platform 200 may determine whether the data received from step 102. For example, whether the data meets a pre-determined value set by the platform 200, to actually be considered a step by the user. In some alternatives, the data received from the sensor may be compared against a pre-determined threshold value set by the user. As is known in the art, the resistance of the pressure sensors is lowered when compressed. Accordingly, voltage output of the pressure sensors will vary with applied pressure. In some alternatives, the pre-determined threshold may be a reduction in the pressure sensors voltage output from approximately 5% to approximately 20%, more preferably, approximately 10%.

In step 105, after the analysis in step 104, the sensory module 203 may also broadcast the TileID and/or SideID data received from the sensory module 203 to the DCM 206. For example, the communication framework RS485 may be used to implement communication between the nodes in the tile network module 201. The RS485 framework may not be compatible with the computer application 210. The DCM 206 may convert the RS485 framework data received from the tile detection module 202 and sensory modules 203 through the RS485 communication bus 204 in to another compatible format, such as the RS232 communication framework.

Figure 11:
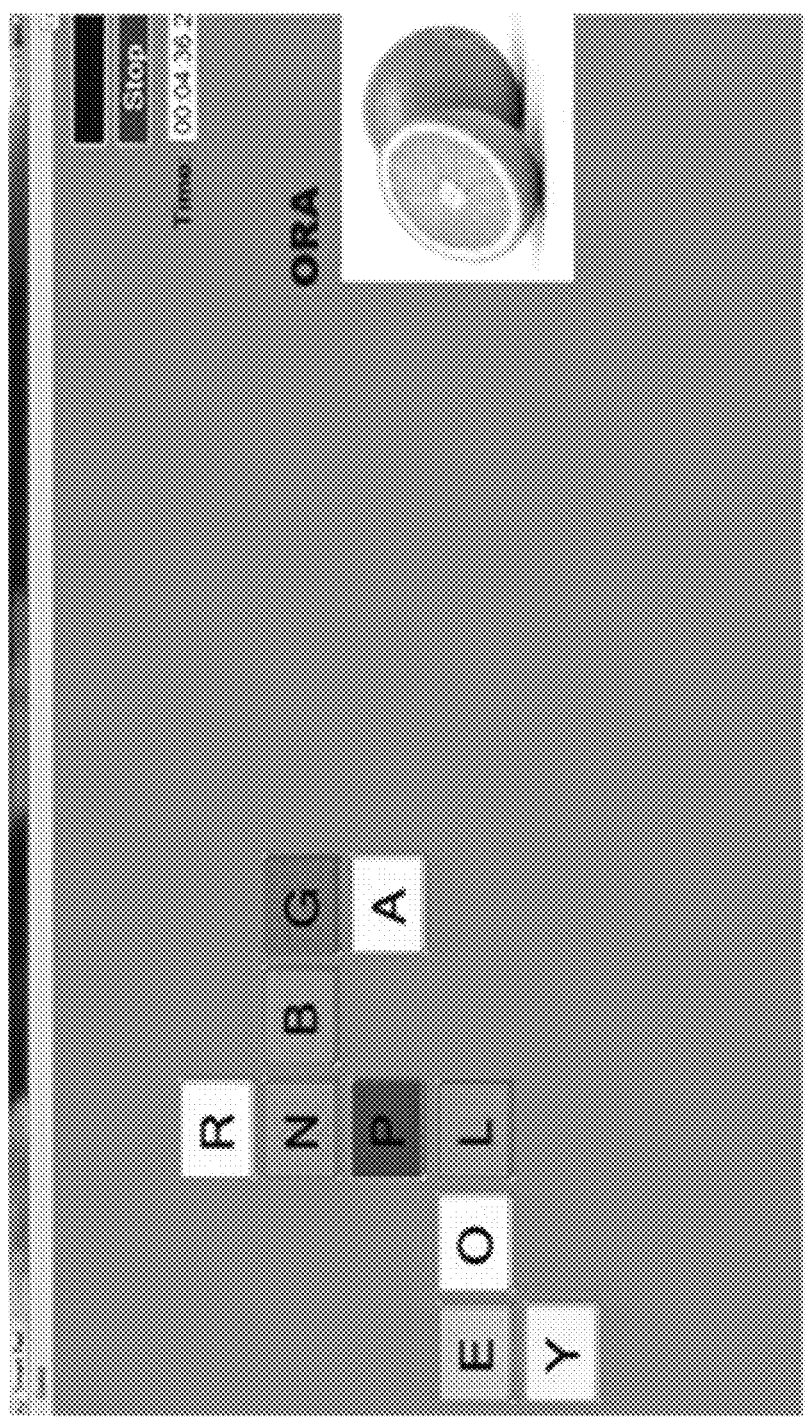
FIG. 11 is an illustration of a GUI for an exemplary computer application using the platform 200 according to one embodiment of the invention.
Figure 12:
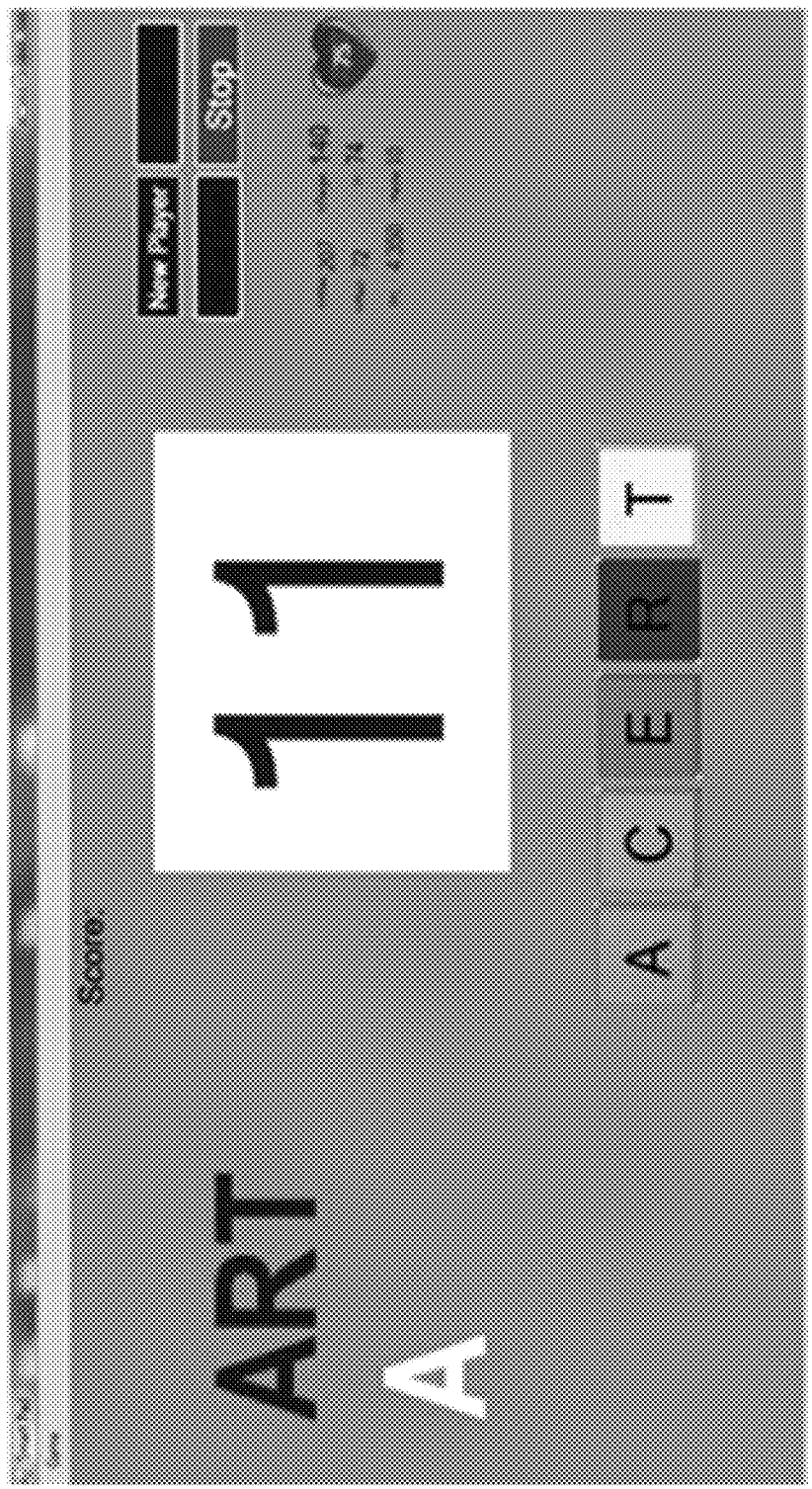
FIG. 12 is an illustration of a GUI for an exemplary computer application using the platform according to one embodiment of the invention.
Figure 13:
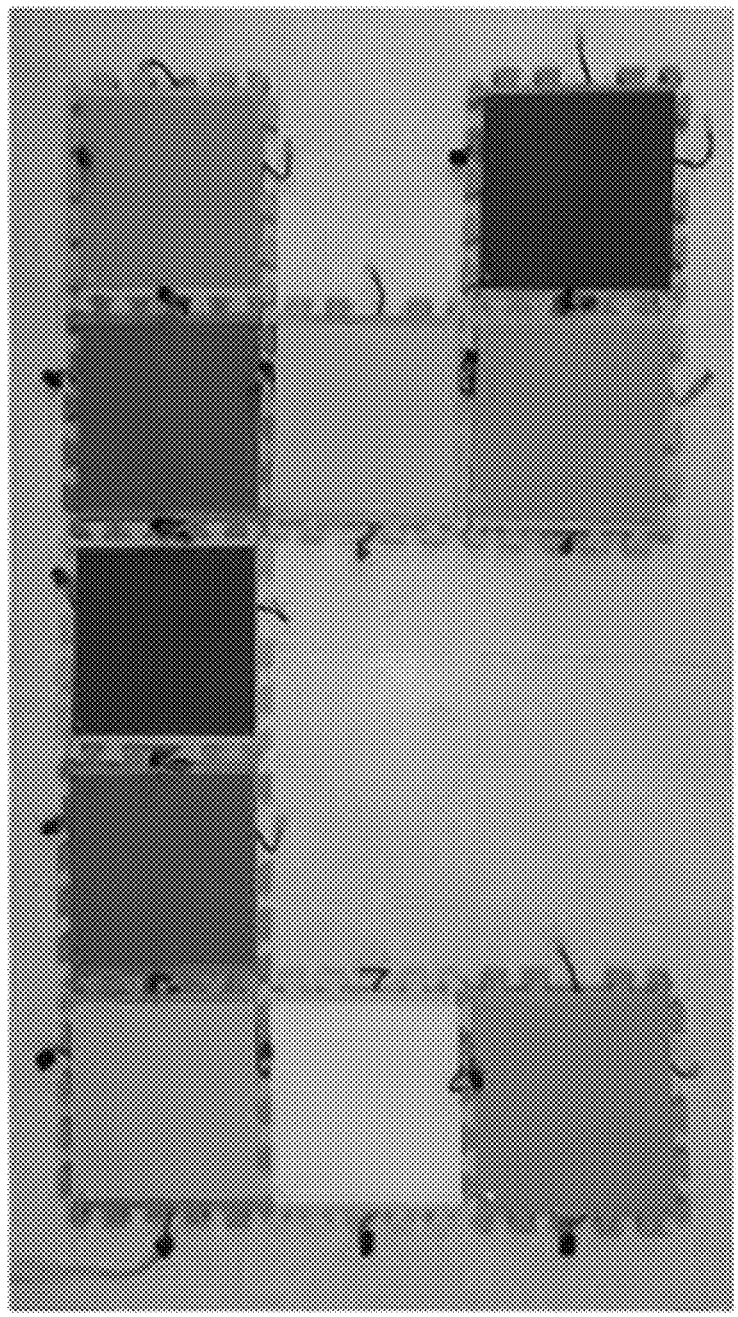
FIG. 13 is an illustration of an exemplary physical configuration of a tile network module according to one embodiment of the invention.

In step 106, the platform 200 may analyze the data received from the tile detection module 202 and sensory modules 203 to determine the source of the data. If the data originated from the sensory modules 203, for example, it may include a TileID. Then in optional step 107, the platform's 200 management module 208 may send a user event to the user's application 210. If the data originated from the tile detection module 202, for example, it may include a TileID and a Side ID. Then, the platform's 200 management module 208 may send the data to the platform's mapping module 209. In some alternatives, the management module 208 may also send a shape update event to the mapping module 209. The mapping module 209 may update the visual representation of the tile network module 201 in real-time based on the data received from the management module 208 as illustrated in FIGS. 11 and 12.

The management module 208 may also be responsible for detecting the type and context of data that may be received from the DCM 206 and generating events, which may be sent to the user application 210. In some alternatives, upon receiving data from the DCM 206, the management module 208 may first count the number of tiles 205 that may have sent the data. If the count is 1, the management module 208 may analyze the data and may determine whether it may have originated from the sensory module 203 or the tile detection module 202. If the count is greater than 1, the management module 208 may determine that the data may have originated from the tile detection module 202. Information originating from the tile detection module 202 may be passed to the mapping module 209 to map the physical shape of the tile network module 201 onto a Connection Status Tree (CST) stored in memory at the computer 207. The CST may be a graph represented by an adjacency matrix, which may describe the shape of the tile network module 205. When the mapping activity is completed, the management module 208 may send one or more shape update events containing the CST to registered user applications 210. If the information received from the DCM 206 originated from the sensory module 203, the management module 208 may send a sensor event, which may contain the TileID and/or SideID of the corresponding tile 205 to the user application 210.

The mapping of the physical tiles 205 onto a CST stored in memory at the one or more computers 207 and displaying the CST on a display may occur in real-time. In some alternatives, this mapping may occur anytime a user activates a user application 210. The CST may be subsequently forwarded to one or more user applications 210. For example, upon receiving data from the management module 208, the mapping module 209 may compare the data with one or more CSTs. If the data indicates that a new node 701 may have been added to the tile network module 205, the mapping module 209 may use the data to calculate the position of the newly connected node 701. The mapping module 209 may update the one or more CSTs by adding the TileID for the new node 701 to the one or more CSTs. The mapping module 209 may subsequently send the calculated data to the management module 208. If the data indicates that a new node 701 may have been removed from the tile network module 201, the mapping module 209 may use the data to calculate the position of the recently disconnected node 701. The mapping module 209 may update the one or more CSTs by removing the TileID of the disconnected node 701 from the one or more CSTs. The mapping module 209 may subsequently send the calculated data to the management module 208.

The user application 210 module can be any application that may use the platform 200 as an input device. The user application 210 module may listen to events coming mapping module 209 and/or management module 208 to update its status. The user application 210 may receive two types of events from the management module 208. Sensor events may indicate which tile 205 may have been stepped on. Shape update events may notify the user's application 210 in real-time about changes to the shape of the tile network module 205. The mapping module 209 and/or management module 208 interactions with the user application module 210 may be illustrated in Example 1 below.

In another embodiment, the LED 601 embedded with each tile 205 may respond to auditory or visual cues from the user applications 210. The auditory or visual cues may correspond to time limits for the user applications 210, the order in which the user should interact with each tile 205, a signal that the user has stepped on a correct tile 205, or other cues from the user applications 210. In some alternatives, each tile may include a plurality of LEDs 601. In some alternatives, the plurality of LEDs 601 may include a variety of shapes. In some alternatives, the variety of shapes may correspond to objects with the user applications 210. In some alternatives, the plurality of LEDs 601 may flash in response to auditory or visual cues from the user applications 210. For example, a user may follow flashing LEDs 601 in response to auditory or visual cues from the user applications 210, by jumping from one tile 205 to another tile 205 in response to auditory or visual cues from the user applications 210. The user jumping from one tile 205 to another tile 205 may increase the heart rate of the user as described below, corresponding to conventional measurements for a light or moderate exercise. For example, the auditory or visual cues may be a timer signaling the amount of time a user has left to complete a specific task.

The invention will be illustrated in more detail with reference to the following examples, but it should be understood that the present invention is not deemed to be limited thereto.

Example 1

Figure 15:
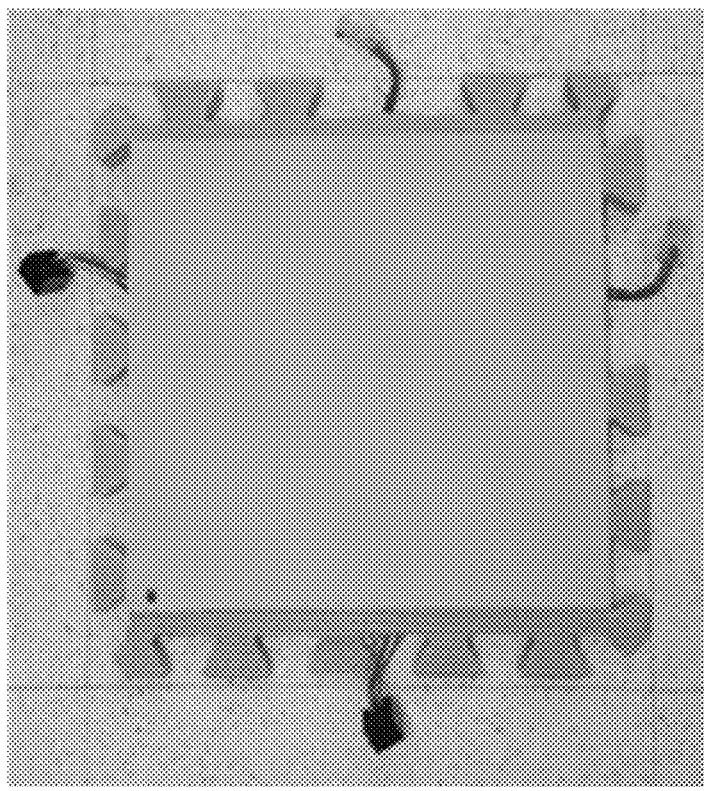
FIG. 15 is an illustration of an exemplary tile with RJ45 connections according to one embodiment of the invention.
Figure 16:
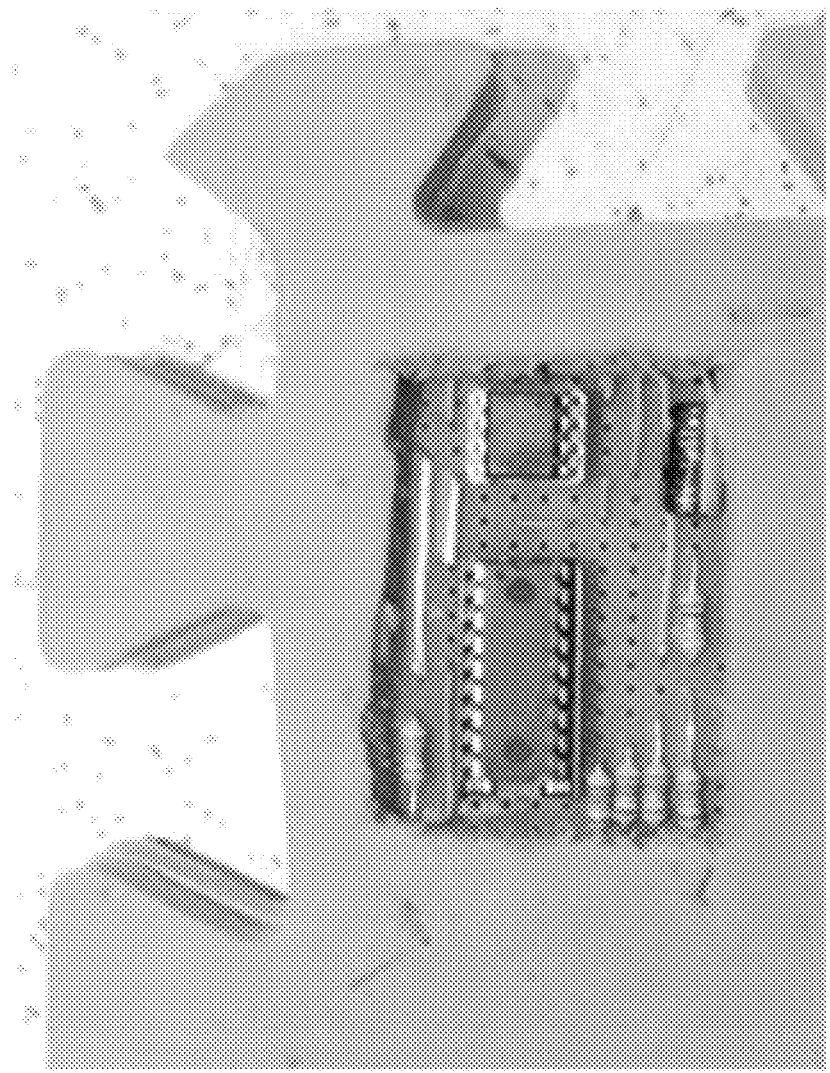
FIG. 16 is an illustration of a microcontroller embedded within one or more foam tiles according to one embodiment of the invention.

The platform 200 may include a tile network module with up to 32 tiles 205. The tile network module 201 may be configured in a variety of shapes suitable for interacting with several exemplary user applications for education, entertainment and physical exercise, such as a memory game, a spelling game and a SmartPad exergaming and edutainment diversion ("SPEED") game. Each tile 205 may include an integrated 405 Picaxe-18 M2 microcontroller with 16 configurable I/O ports. The "2400, N, 8, 1" 406 (Baud rate, Parity, Data bits, Stop bits) protocol configuration may be used by the Picaxe serial communication module. The microcontroller I may be attached one or more differential bus transceiver s, for example, SN75176, for serial data communication. The use of Picaxe microcontrollers may result from their small size, low cost, and programming simplicity. A 1.75×1.5" square FSR sensor may be embedded in each tile 205. This sensor may be located anywhere on the tile 205, and more preferably may be located towards the center of the tile 205. The sensor may be protected by approximately 2 mm layer of a foam material, which may cover the surface of each tile 205. Each tile 205 side may have a male or female RJ45 connector with 6 lines as illustrated in FIG. 15. The connectors may be arranged in a pattern for easily connecting the tiles 205. The +5 V power may be supplied to the tiles 205 from the computer 207 serial interface, universal serial bus (USB) through the DCM 206. The attached LED 601 may be for the power IN 306 indication. The platform 200 components may be inserted in between two 12×12" square foam layers as shown in FIG. 16.

Figure 8:
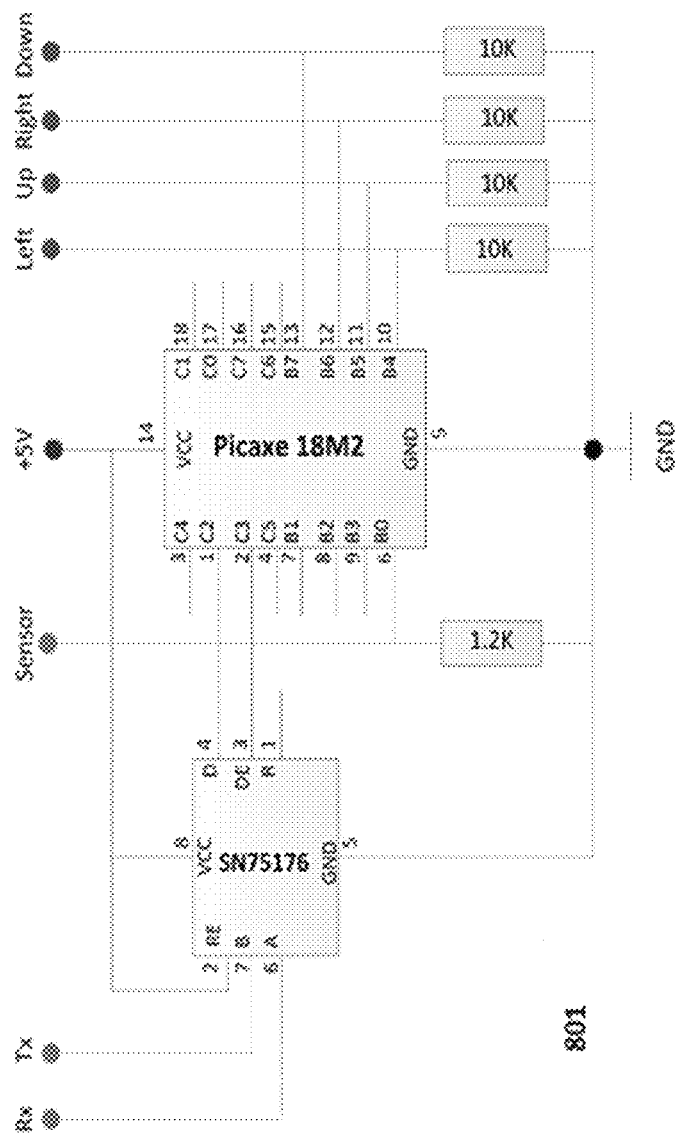
FIG. 8 is a schematic illustration of an exemplary tile microcontroller according to one embodiment of the invention.

An ATmega 168 microcontroller on an "Arduino Uno" board may be used to perform all of the necessary communication between the tiles 205, the tile network module 201 and the computer 207. This communication may be achieved by translating data in the RS485 framework from the tiles 205 or the tile network module 205 to a compatible format, such as RS232 as shown in FIG. 8. The microcontroller 801 may be attached to a differential bus transceiver, for example, SN75176, which may be used to receive data from the tiles 205 through the serial bus. The computer 207 may supply both the DCM 206 and the tile network module 201 circuits with a Vcc power through the USB port. The platform 200 microcontrollers' 801 software may be implemented using the PICAXE Programming Editor. This programming editor may use BASIC commands supported by the PICAXE system. The DCM 206 software may have been the Arduino IDE, which may be an open-source project for programming Arduino microcontrollers using the processing/wiring language. All user applications 210 for the platform 200 may have been implemented using Visual Studio 2008 C# on a Windows 7 platform.

Memory Game

Figure 10:
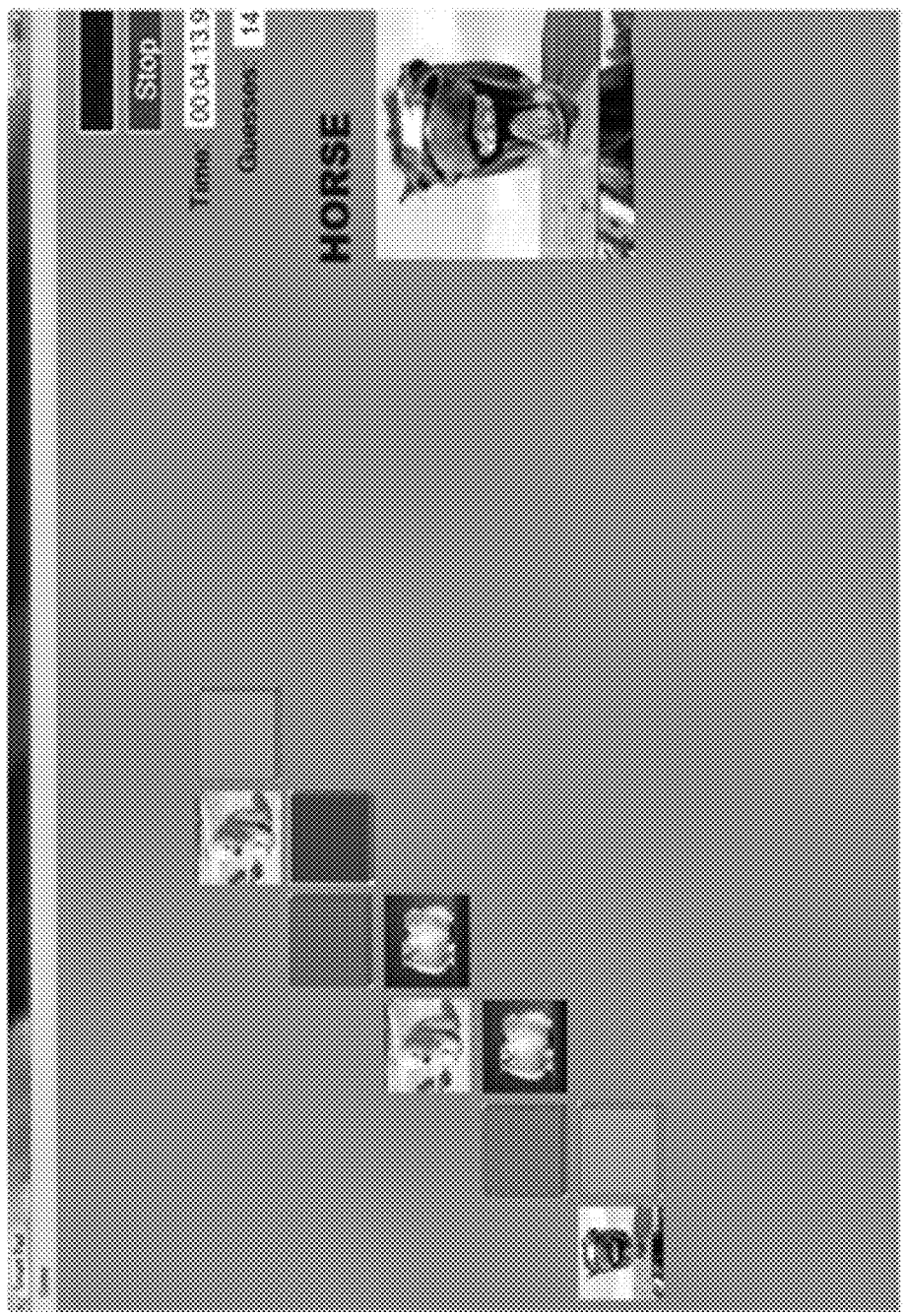
FIG. 10 is an illustration of a Graphical User Interface ("GUI") for an exemplary computer application using the platform according to one embodiment of the invention.

For the memory game, the user, a child, may be required to find matching pairs of pictures among a set of images. Unlike traditional memory games that are played with a mouse, the platform 200 may use a set of tiles 205 integrated with one or more sensors. The user may have to step onto one or more of the tiles 205 to interact with the memory game. Every step on a tile 205 may reveal an associated picture shown on the corresponding mapped tile network module 205 on the screen. The platform's 200 media content can be customized by parents or guardians to suit the child's learning needs, thereby enhancing his or her cognitive development. The memory game may include images that aim to expand children's knowledge by introducing them to animals, birds, and many other different entities. In addition, every picture displayed in the memory game may be associated with a verbal and/or written spelling of the entity being shown. Such functionality can enrich the vocabulary of the children, consolidate their current knowledge of objects they might already know, and may widen their boundaries for learning by introducing them to new objects and shapes they might not have seen before. FIG. 10 illustrates the GUI of the memory game.

Spelling Game

The spelling game may teach reading and writing skills to children who are at earlier stages of their development. For example, children can spell a word with the tiles 205 on a screen and get a corresponding picture, audio and textual description of the word on a screen. First, the word may appear on the screen for a short period of time. Thereafter, the platform 200 may display a set of random letters on the mapped tiles 205. The user has to step on the tiles 205 in order to spell the word depicted by the image. The spelling game may have different word categories that a guardian can select for the children. Some of the categories may include, but is not limited to, animal names, transportation, fruit, colors, and other categories appropriate for children. The spelling game may verbally pronounce and depict a graphically representative picture of every word. The spelling game may also provide sound effects to provide feedback to the child, when they step on the correct tiles 205. FIG. 11 illustrates a GUI of the spelling game.

SPEED Game

The SPEED game may encourage children to stay physically active during game play while interacting with a fun game. The SPEED game may be an implementations of the spelling game with an implementation a mechanism that may control the time available for a child to spell a word according to his/her heart rate. Measuring the heart rate of the users may be an added feature of this game, because it is a conventional indicator of physical exercise intensity. The goal of SPEED game may be to constantly reduce the difference between the child's Heart Rate (HR) and the Target Heart Rate (THR) calculated for the particular exercise intensity. This may indicate that the child may be exercising at that particular intended intensity. To achieve that, the user's HR may be collected continuously through, for example, heart rates monitor and sent via a communication network to the game. To calculate the THR, the maximum Heart Rate ($HR_{max}$) may be calculated first. This may correspond to the highest level of a healthy heart rate during exercising. $HR_{max}$ may be calculated though, for example, the following equation: $HR_{max}=206.9-(0.67 \times Age)$. Using the calculated $HR_{max}$, the THR for various exercise intensities may be calculated through, for example, the following equation: $THR=(HR_{max}-HR_{rest}) \times Intensity + HR_{rest}$, where HRrest may be the heart rate of the user measured at rest. The intensity may reflect the strength of the exercise. In the SPEED game, the user can choose an intensity level from approximately 30% to approximately 90% of the $HR_{max}$, more preferably from approximately 30% to approximately 70% of the $HR_{max}$, and most preferably from approximately 40% to approximately 60% of the $HR_{max}$. The latter range may correspond to moderate exercise levels based on conventional framework s. To push the user towards the target HR during game play, the time available to spell a word may be shortened or lengthened depending on the size of the wedge between the target and current heart rate of the user. This may be calculated, for example, through the following equation: $TPL_t = TPL_{t-1} - \alpha \times (THR - HR_t)$. Where $TPL_t$ may be the time per letter at time t, $HR_t$ may be the heart rate reading at time t and $TPL_{t-1}$ may be the time per letter at time t−1. TPL may be calculated for every new word displayed on the screen to be spelled by the user. α may dictate how fast the TPL may be changed to keep the HR close to THR. For example, a value of approximately 0.01 for a may be appropriate. Based on the latter equation, a user may be provided with less time per letter when his/her HR is below the THR, which may encourage the child to move faster. The user may be provided with more time per letter when their HR exceeds the THR in order to slow down his/her movement. The time per word may be calculated by multiplying TPL by the number of letters in a given word.

Figure 14:
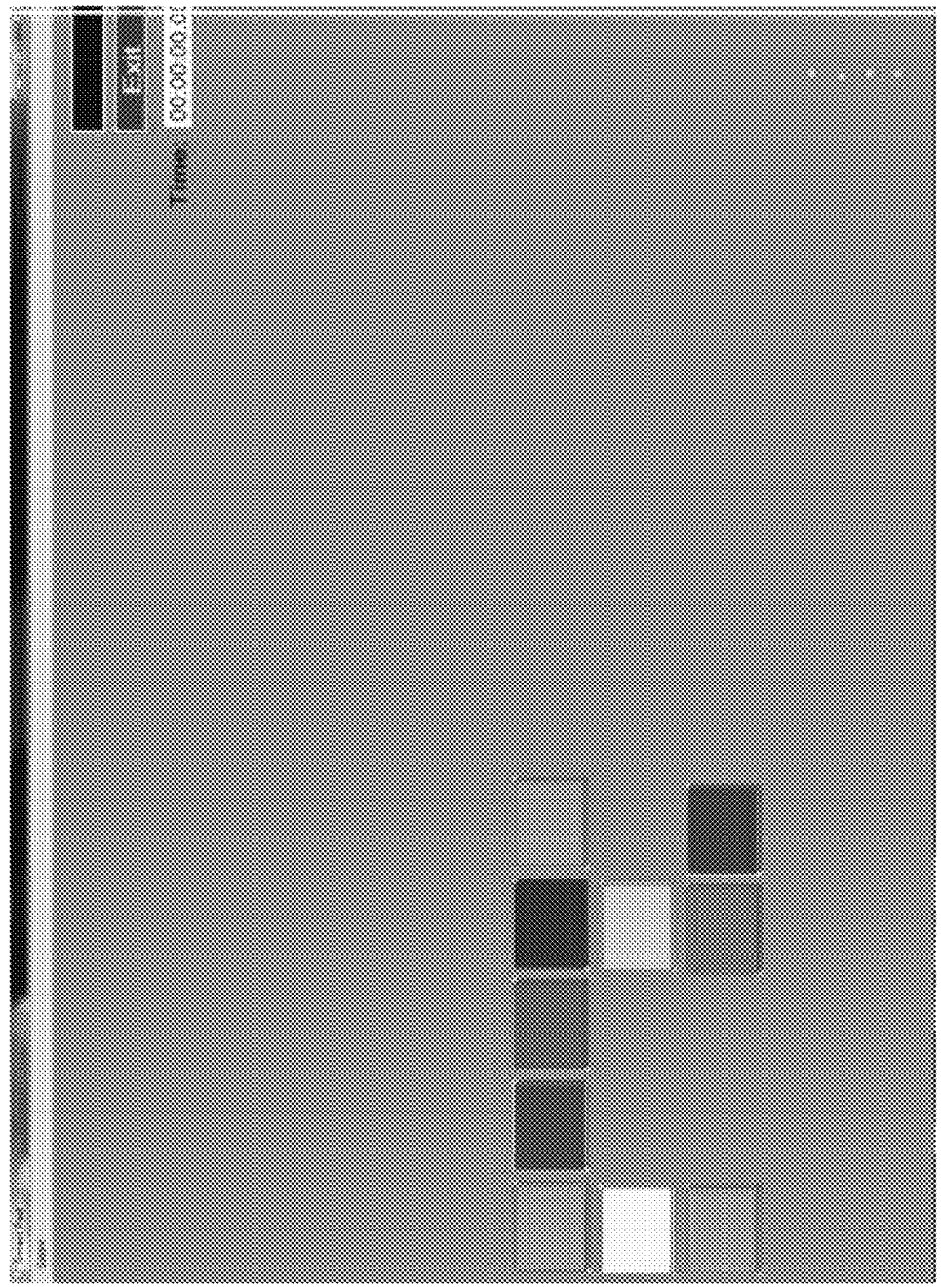
FIG. 14 is an illustration of a GUI for an exemplary virtual mapping of the physical configuration of the tile network module in FIG. 13 according to one embodiment of the invention.

A Zephyr H×M heart rate monitor may be used to monitor the user's heart rate. The device may be composed of an electronics module installed on an elastic belt equipped with conductive fabric. The belt may be worn comfortably on the torso. The device may collect heart rate measurements and may send them every second to the computer 207 via a Bluetooth channel or a Wi-Fi connection. The computer 207 running the SPEED game may be equipped with a Bluetooth adapter or Wi-Fi adapter, which may allow the SPEED game to receive the heart rate measurements. FIG. 14 illustrates the GUI interface of the SPEED game. Because the time remaining to complete the spelling of a word may be an added feature during game play, the GUI may be designed to display it in a clear way so that the user may be motivated to regulate the speed of his/her movements accordingly. The SPEED game GUI may also measure and display the user's HR at rest, display the calculated $HR_{max}$, the calculated THR, the measured instant HR and the score of the user. The score may be calculated by the number of correctly spelled word over the total number of words given.

For the SPEED game, the heart rate information may be used as input to vary the difficulty of the game and may thus encourage the user to reach an optimal heart rate for effective exercising. For example, six children between the ages of 10 and 13 used the platform 200 to interact with the SPEED game. The children's heart rate may have been measured by the Zephyr HxM sensor. The Zephyr HxM sensor may have been strapped over each child's chest for the duration of their interaction with the SPEED game. The sensor may communicate the acquired data to the SPEED game via a communication link, such as, for example, a Bluetooth link. Three levels of difficulty may have been built into the SPEED game according to three selected values of exercise intensities. These levels may have been labeled easy, medium and hard and may have corresponded to 40%, 50% and 60% intensity levels respectively. Table 1 below shows the measured HRrest, the calculated Maximum HR (calculated using equation 1), the intensity level chosen by children and the calculated target HR (calculated using equation 2) for the six children.

TABLE 1

Resting and Target Heart Rates for users of the SPEED game and the Platform 200.

| Subject | Age | Weight (Kg) | $HR_{rest}$ | $HR_{Max}$ | % Intensity | THR |
|---|---|---|---|---|---|---|
| S1 | 10 | 39 | 91 | 200 | 40 | 134 |
| S2 | 11 | 39 | 86 | 199 | 40 | 131 |
| S3 | 11 | 41 | 83 | 199 | 40, 50 | 129, 141 |
| S4 | 11 | 45 | 87 | 199 | 40 | 132 |
| S5 | 11 | 34 | 94 | 199 | 50 | 147 |
| S6 | 13 | 49 | 93 | 198 | 50 | 145 |

Table 1 show that user's HR may have gradually increased to stabilize in the vicinity of the target HR and almost remained at that level. Table 1 and the derived time per word control mechanism presented in the equations above may have helped the children reach a target heart level for specific exercise intensity levels.

After reviewing children's interactions with the platform 200 and the games above over a two week period, in one to two hour sessions of game play, the platform 200 may also have encouraged the children to move around while playing the games, as measured by the SPEED game results in Table 1 above. The physical movement by the children may have corresponded to conventional measurements for a light or moderate exercise.

Although the foregoing description is directed to the preferred embodiments of the invention, it is noted that other variation and modifications will be apparent to those skilled in the art, and may be made without departing from the spirit or scope of the invention. Moreover, features described in connection with one embodiment of the invention may be used in conjunction with other embodiments, even if not explicitly stated above.

The invention claimed is:

1. A dynamic user interface system for interacting with computer applications through a physical environment, the system comprising:
   a network with at least one data communication bus, a plurality of nodes connected to the at least one data communication bus capable of being configured into a plurality of shapes and receiving sensory input data from a user, and a platform upon which the plurality of nodes are disposed;
   wherein the plurality of nodes comprises a plurality of interactive tiles, wherein each of the plurality of interactive tiles comprises electronic circuitry being operable for:
   identifying a connection status for at least one tile adjacent to each of the plurality of interactive tiles;
   identifying a source for data received by each of the plurality of interactive tiles;
   converting the data received by each of the plurality of interactive tiles from a first format into a second format; and
   transmitting the converted data to a data collection module via a communication network,
   wherein the plurality of interactive tiles are configured to be removable or addable during operation of the system,
   wherein each tile comprises a plurality of dynamic unique identifiers,
   wherein the plurality of dynamic unique identifiers comprises a dynamic tile identification number and a dynamic side identification number, and
   wherein the plurality of dynamic unique identifiers are assigned to the plurality of interactive tiles each time the platform is activated.

2. The system of claim 1, wherein the data collection module comprises at least one computer.

3. The system of claim 2, wherein the at least one computer comprises one or more computer applications capable of receiving sensory input data from the network.

4. The system of claim 1, wherein the electronic circuitry further comprises a module for updating a display of the network in real time.

5. The system of claim 1, wherein the communication bus is selected from a group consisting of: an RS485 bus, I2C bus, USART, RS232, SPI, One-wire, CAN, other conventional communication bus, and combinations thereof.

6. The system of claim 1, wherein the electronic circuitry is selected from a group consisting of one or more microcontrollers, one or more sensors, one or more actuators, one or more light sources, one or more display modules, and combinations thereof.

7. The system of claim 6, wherein the electronic circuitry is at least partially embedded within each of said plurality of interactive tiles.

8. The system of claim 6, wherein said one or more light sources are configured to illuminate when each of said plurality of interactive tiles receives power from the at least one adjacent tile.

9. The system of claim 8, wherein said one or more light sources is a light-emitting diode.

10. The system of claim 6, wherein said one or more light sources are configured to receive auditory or visual cues from the one or more computer applications.

11. The system of claim 1, wherein the sensory input data is selected from a group consisting of: touching the least one of said plurality of interactive tiles, standing on the least one of said plurality of interactive tiles, jumping on the at least of said plurality of interactive tiles, and combinations thereof.

12. The system of claim 1, wherein each of said plurality of interactive tiles comprises one or more colored foam tiles.

13. A method for interacting with a computer application through manipulation of a physical environment, the method comprising:
   activating one or more computer applications, wherein said one or more computer applications are capable for receiving input from a network;
   identifying the network with one or more nodes capable of being configured into a plurality of shapes for receiving sensory input data from a user;
   receiving data from the network;
   comparing the received data against a pre-determined threshold;
   converting the compared data from a first format into a second format;
   transmitting the converted data over a communication network to a data collection module;
   analyzing the transmitted data at the data collection module to identify a source of the data;
   generating event, wherein said event is based on the identified source of the data;
   updating a connection status tree, wherein said connection status tree depicts a current configuration of the network, and wherein said connection status tree is stored in local memory at a computer;
   transmitting the updated connection status tree and the event to the one or more computer applications, wherein said event updates the one or more computer applications, and wherein said connection status tree updates a display of the network on the one or more computer applications in real time;

activating a platform upon which the one or more nodes are disposed, wherein the one or more nodes comprises a plurality of interactive tiles, wherein the plurality of interactive tiles are configured to be removable or addable during manipulation of the physical environment, wherein the received data comprises a plurality of dynamic unique identifiers of the plurality of interactive tiles from the network, wherein the plurality of dynamic unique identifiers comprises a dynamic tile identification number and a dynamic side identification number, and wherein the plurality of dynamic unique identifiers are assigned the plurality of interactive tiles each time the platform is activated.

14. The method of claim 13, wherein the event comprises a shape update event or a user event, and combinations thereof.

15. The method of claim 13, wherein the source comprises a tile detection module or a sensory detection module, and combinations thereof.

16. The method of claim 13, further comprising translating the received data from an analog format to a digital format.

17. The method of claim 13, wherein each of the one or more nodes comprises at least one interactive tile.

18. The method of claim 17, wherein each of the at least one interactive tile comprises electronic circuitry.

19. The method of claim 18, wherein said electronic circuitry is selected from a group consisting of one or more microcontrollers, one or more sensors, one or more actuators, one or more display modules, and combinations thereof.

20. The method of claim 19, wherein the one or more sensors comprises a pressure sensor.

21. The method of claim 20, wherein the pre-determined threshold comprises a voltage output for the pressure sensor reduced by approximately 5% to approximately 25%.

22. The method of claim 21, wherein pre-determined threshold comprises a voltage output for the pressure sensor reduced by approximately 10%.

23. The method of claim 19, wherein the one or more display modules comprises of flashing light emitting diode.

24. The method of claim 23, wherein the flashing light emitting diode is responsive to one or more auditory or visual cues from the one or more computer applications.

25. The method of claim 13, wherein said received data consists of selecting an element from a group consisting of: stepping on the at least one interactive tile, standing on the at least one interactive tile, touching the at least one interactive tile, connection status of each of the at least one interactive tile and combinations thereof.

26. The method of claim 25, wherein stepping on the at least one interactive tile comprises the user jumping from the at least one interactive tile to an adjacent tile in response to one or more display modules.

27. The method of claim 13, wherein the received data results in an increase in a user's heart rate.

28. The method of claim 27, wherein the increased user's heart rate corresponds to light or moderate exercise.

* * * * *